United States Patent [19]

Buffet et al.

[11] Patent Number: 4,838,519

[45] Date of Patent: Jun. 13, 1989

[54] ELECTRIC VACUUM ACTUATOR VALVE

[75] Inventors: Eric Buffet, MC-Monaco; Christian Dragoni, Nice; Pierre Rey, Menton, all of France

[73] Assignee: Eaton Corporation, Cleveland, Ohio

[21] Appl. No.: 705,840

[22] Filed: Feb. 26, 1985

[51] Int. Cl.$^4$ .............................................. F16K 31/02
[52] U.S. Cl. ............................ 251/129.21; 137/596.17; 137/625.25
[58] Field of Search ...................... 251/129.01, 129.08, 251/129.21; 137/596, 596.17, 625.65, 625.27

[56] References Cited

U.S. PATENT DOCUMENTS

| | | | |
|---|---|---|---|
| 2,686,535 | 8/1954 | Tourneau | 251/139 |
| 3,329,165 | 7/1967 | Lang | 251/129 |
| 3,461,911 | 8/1969 | Janczur | 251/129 |
| 3,929,315 | 12/1975 | Rieth | 251/129 |
| 4,102,526 | 7/1978 | Hargraves | 251/141 |

Primary Examiner—Samuel Scott
Assistant Examiner—Noah Kamen
Attorney, Agent, or Firm—R. A. Johnston

[57] ABSTRACT

An electrical valve having three paths, of the type comprising a valve body which is in permanent communication with an apparatus, controlled by fluid, notably by pneumatic partial vacuum, and is in alternate communication with either a fluid source of energy or with an outlet region, the passage from source to such outlet region and back being controlled by the plunger of an electromagnet permanently subjected to the action of a return spring urging the plunger to close such source. The valve body forms a control chamber of small dimensions, located on the outside of the electromagnet parts, wherein which communicates with the three paths. An extension of the electromagnet plunger provided with a single stopper seal which controls alternatively the source of energy and the orifice of the outlet region extends into the control chamber.

7 Claims, 2 Drawing Sheets

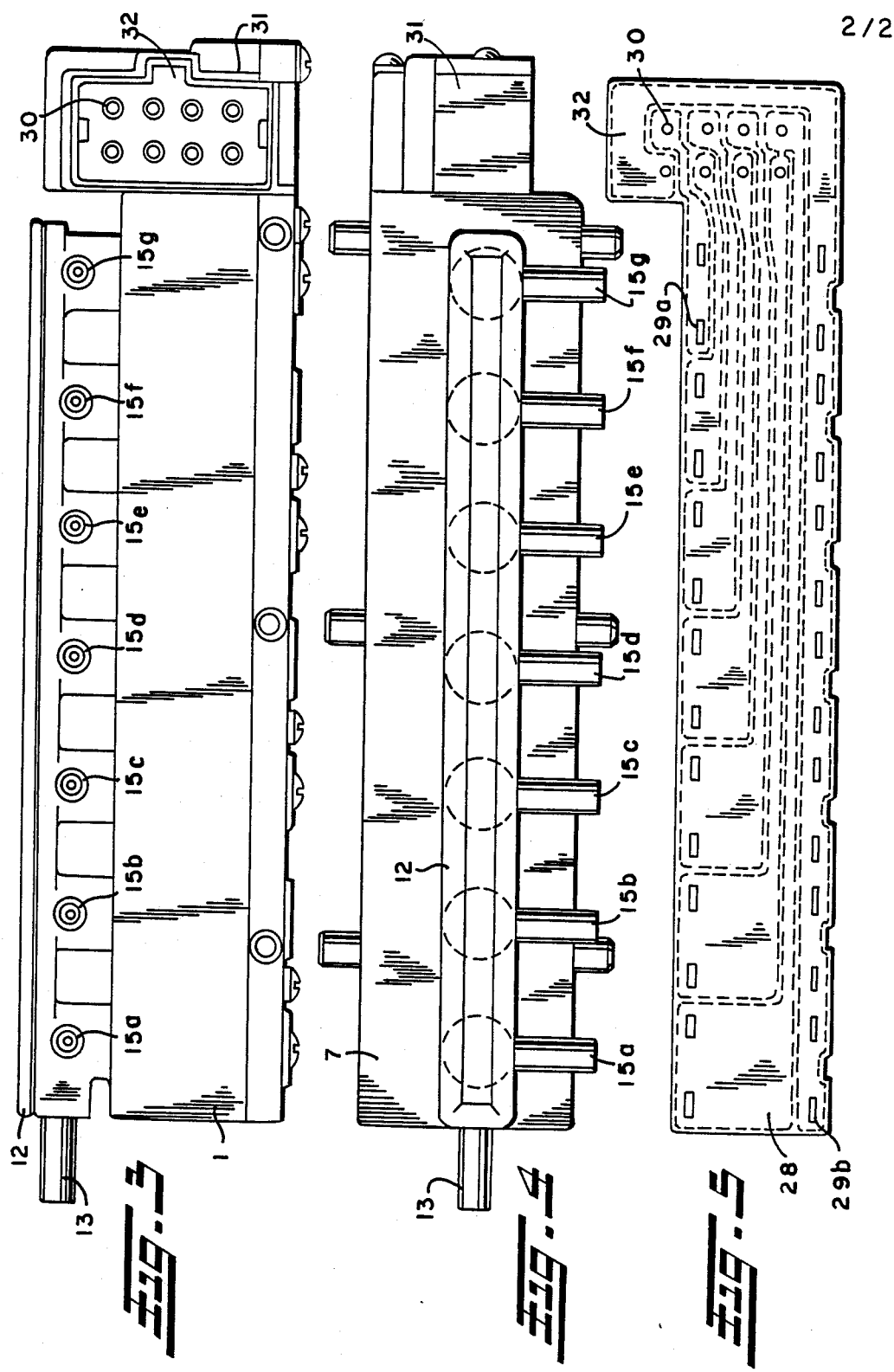

ELECTRIC VACUUM ACTUATOR VALVE

BACKGROUND

The present invention relates to electromagnetically controlled valves, referred to hereinafter as "electrovalves" intended to allow a relationship between the partial vacuum originating in a vehicle engine and various pieces of equipment and devices whose operation may be controlled by such partial vacuum, the considerable power of which is known to be generally lost once the valves have been operated. Among such devices there are, for instance, air-conditioning distribution shutters, driving members for the anti-pollution device, a speed regulator, retractable lights, a central locking system for doors, the roof and the trunk and similar items.

Electrovalves of this type are already known in the art and have, at one end, a connecting pipe to the apparatus to be controlled opening into the body of the valve without an outlet stopping member and, at the other end, a pair of pipes, the first being connected to the partial vacuum origin and the second opening either on the outside or at the supply of a second similar electrovalve connected in series to the first one, one of the two latter pipes being open when the other is closed and vice-versa. There follows that the apparatus to be controlled is constantly connected either to the partial vacuum in the engine or to the outside, or to another similar system operated by the residual partial vacuum in the engine to which we shall generically refer as an outlet region.

As a rule, these two pipes are arranged coaxially on the two opposite end faces of the valve body and the alternate blocking and opening of the two pipes is generally controlled by the axial translation of the core of an electromagnet, whose armature and winding are also located inside the mentioned body, each end of the core being fitted with a pad made of a material acting as a seal. The pad disposed adjacent the connection to the partial vacuum origin is usually restored, by means of a return spring, against the seat provided by the mouth of the pipe; whereas, the other pipe stays open as long as the electromagnet is not excited.

When the user wishes to work one of the devices listed above by way of examples, he operates a switch which excites the electromagnet, thus causing an axial movement of the core against the spring and connecting the partial vacuum origin to the mentioned device and simultaneously closing "the outlet" by the interposition of the other pad acting as a seal which comes to rest on the outlet seat.

This type of device is very simple and widely used, but it still has a number of drawbacks.

Firstly, heretofore, these known devices have been equipped with return springs positioned around the core inside the coil, hence the coil is less powerful and more cumbersome.

Secondly, since the material of which the two pad seals are made has to withstand significant stresses, from the chemical (corrosion), physical (wide temperature variations), and mechanical (slanting surfaces resting against circular openings made on flat surfaces) points of view, it has to be selected from among very costly elastomers; additionally, it is in any case necessary to provide two seals for each valve and this doubles the amount of sealing material required for each valve.

SUMMARY OF THE INVENTION

The present invention solves all these drawbacks and offers new advantages by means of a unique and novel arrangement in the manufacture of the valve body.

According to the invention, the alteration consists in separating, in the mentioned electrovalve, the space containing the electromagnet as such from the valve body, also known as the control chamber, into which the said three pipes open, which consequently is restricted to a space of small dimensions located on the outside of the coil and of the armature of the electromagnet. This arrangement offers several advantageous results.

The distance between the partial vacuum origin and the outlet is now very short, a single seal can be mounted on the end of the stem which extends the electromagnet core to the control chamber, so that this single seal may act, by means of each of the corresponding pipes, depending on the condition of the electromagnet. Therefore, the two seals required of the devices of the prior art are now replaced by a single, hardly more bulky seal. Therefore, this new device is simpler to make and considerably more economical costwise. Resulting additional advantages will be discussed later on.

Instead of placing the return spring inside the coil, it can be mounted in the control chamber around said stem, between a shoulder of the single seal and the facing bottom of said chamber; this allows a gain in magnetic power when the device is working.

Finally, in the usual case when several electrovalves are mounted in series, and there is one common origin of partial vacuum, to supply several devices by operating a corresponding number of electromagnets, all the corresponding coils each having a single armature therein and located in a single case, the control chambers being spread apart along this case from which an equal number of pipes originate for the control of the devices concerned. All of the electrical circuitry for exciting the coils is printed on one of the faces of said case or on a plate closing the armature common to all coils.

In the aforementioned arrangement, the chamber communicates at a suitable position on the single seal, with an outlet passage located between the body of the core and the inner face of the winding. This passage will open, either into an outlet orifice to the outside, preferably equipped with a thin layer of filter material, in the form of packing, or into a fluid pressure sealing connection, so as to form a new origin of partial vacuum for a second similar device mounted in series behind the first one.

In order to avoid this single seal wearing out too quickly, it preferably has an outline which is slightly inclined in relation to the plane of each orifice with which it cooperates. It also acts as a guide for the spring around it.

The invention will now be described in detail with reference to the attached drawing, wherein:

BRIEF DESCRIPTION OF THE DRAWINGS

FIG. 3 is a view from above of a seven-valve assembly according to the invention, of which FIG. 1 is a vertical section.

FIG. 4 is a side view of the same assembly.

FIG. 5 shows a printed circuit plate, such as shown in FIG. 1.

DETAILED DESCRIPTION

Figure 1:
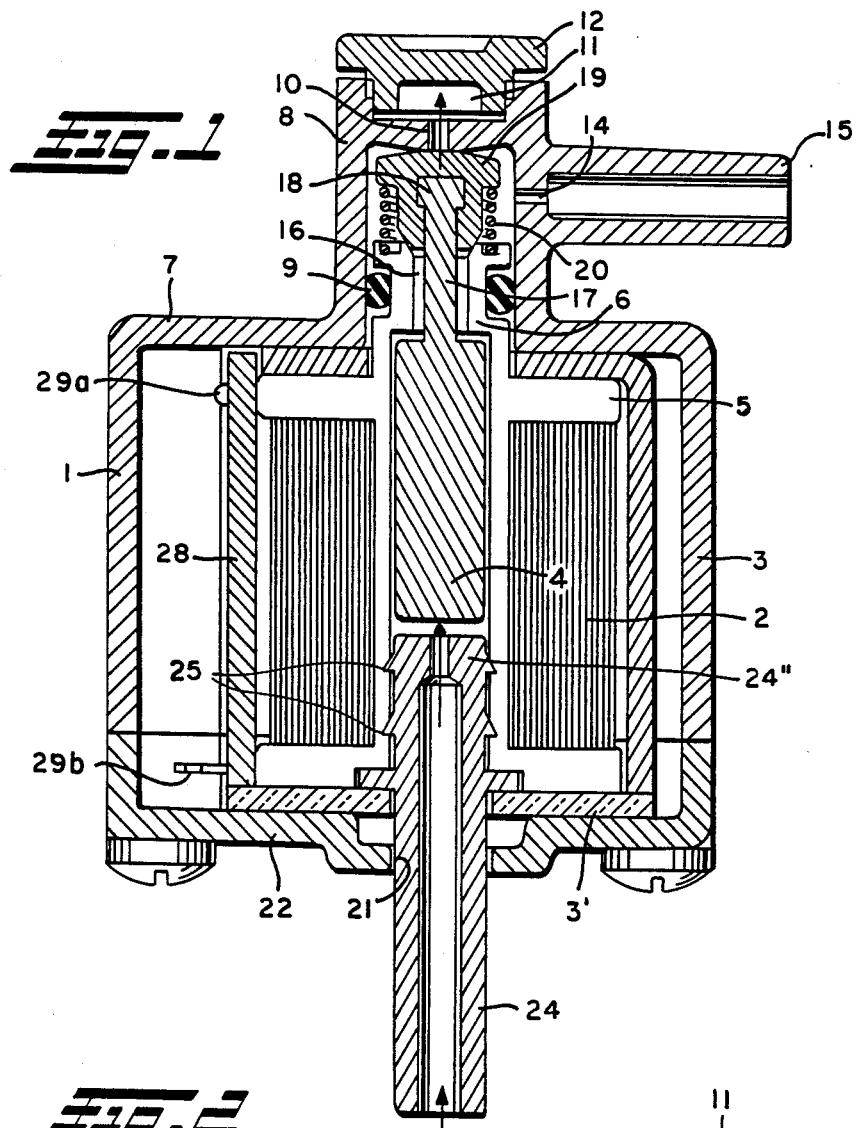
FIG. 1 is an axial cross-section of an electrovalve according to the invention and also a vertical section of an assembly comprising seven electrovalves of this type and shown in the following figures.

With reference to FIG. 1, there is shown at 1 a case moulded in a plastic material inside which there is positioned an electromagnet comprising a winding 2 mounted inside a two-part stationary metal armature or pole frame, comprising an angled stationary bar 3 and a plate 3', and an axial member 24 and a movable core 4. The winding 2 is insulated from an armature portion. The body 5 forming a bobbin and made of a plastic material is provided with a neck 6 which passes through an aperture in the upper face 7 of the case 1 to enter a valve body 8, having therein control chamber 8A, control chamber positioned over the case 1. A seal 9 ensures fluid pressure sealing between the neck 6 and the body chamber 8.

This chamber 8a has three communication paths. Firstly, it communicates through an upper aperture 10 with the origin of a partial vacuum. In the case shown of a seven-valve assembly, the openings 10 of all the chambers 8 are together joined to a manifold 11 the opening 10 being shown closed by a plate or temporary plug 12 and the manifold 11 is connected to the partial vacuum in the engine by a single pipe 13.

Secondly, through a side aperture 14, it communicates with a pipe 15 connected to the apparatus to be operated. In the case of a seven-valve assembly, there are as many individual pipes 15a, 15b, 15c . . . 15g as there are valves.

Figure 2:
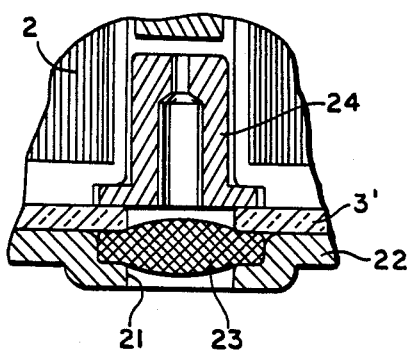
FIG. 2 is a partial view of a modification of FIG. 1.

Thirdly and finally through a central orifice 16 of the neck 6 of the body 5, it communicates with an outlet zone, i.e. either with a similar device mounted in series (embodiment of FIG. 1) or directly with the outside (embodiment of FIG. 2).

Moreover, the upper part of the core 4 has at its upper part an extension in the shape of a stem 17 which ends in a head 18 which is used to provide a seal 19 which will be described in detail with reference to FIG. 6.

Under normal conditions, i.e. when the electromagnet is not excited, this seal is pushed against the aperture 10 by a spring 20, thus freeing the orifice 16. In the contrary case, when the magnet is excited, the plunger core 4 is pulled downwards in opposition to spring 20, closing the orifice 16 and opening the aperture 10.

In a condition when the electromagnet is not excited, the aperture 14 communicates with the orifice 16, i.e. the pneumatic control system for the device concerned is in communication with the outlet, hence the device itself is at "rest".

When a user excites the electromagnet, such as by operating the control button for the wanted device on the vehicle dashboard, the aperture 14 is made to communicate with the aperture 10, i.e. with the origin of the partial vacuum in the engine, whereas the outlet orifice 16 is blocked. Therefore, the device control system becomes operational under the action of the power generated by the partial vacuum and works as long as such button is operated, but it immediately returns to the same "rest" position as previously, as soon as the button is no longer operated.

The outlet region may be the outside itself, as shown in FIG. 2. In this case, an orifice 21 is the lower face 22 of the case 1 is equipped with a packing element 23 made of cellular material and acting as a resilient seal. Above such an element 23 there is mounted a pipe 24. In the embodiment of FIG. 1 the packing element 23 is replaced inside the opening 21 by a pipe 24' which is secured in an unmoveable way within the material of body 5 by any suitable means such as the barbs shown in the drawing 25. Via this pipe, the outlet of a first valve communicates with the entrance to a second valve mounted in series, so that several devices may be alternatively operated.

In both cases, the fluid enters by the orifice 16 and leaves through orifice 21, to circulate between the plastic body 5 and the core 4. To make this circulation easier, it is advantageous to provide the core with a polygonal, for example hexagonal, cross-section.

Figure 6:
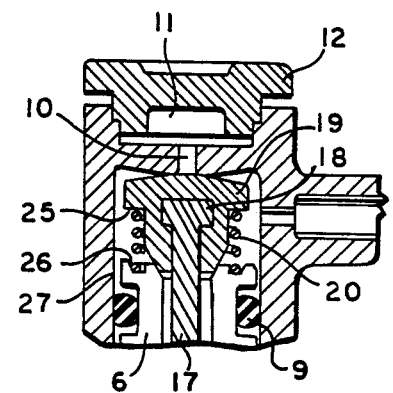
FIG. 6 shows in more detail the shape of the single seal according to the invention.

Referring now more specifically to FIG. 6 which shows, in enlarged view, the part of FIG. 1 corresponding to the present invention, one can see that inside the valve body or control chamber 8a, there is located the single seal 19 which is attached to the head 18 of the stem 17 which extends the core 4 into the chamber. This single seal offers a whole series of advantages.

Firstly, in practice it is no more cumbersome than the corresponding seal of previous devices, which needed a second seal to be mounted on the lower face of the core 4 to act as a stopper for the orifice 21, or its equivalent.

Secondly, the shape as shown in FIG. 6 (not shown in FIG. 1) is particularly suitable both for reducing the wear and tear of the seal against the two seats formed by 10 and 16 and for acting as a guide for the spring 20. In practice, experience has shown that, if the shape is conical, such as is normally used to block an aperture, it would be inclined to be worn down.

In the presently preferred practice of the invention, each opposing face of the seal is only slightly curved, thus providing excellent tightness and a much reduced rate of wear. The spring 20 rests on one side, against a shoulder 25 of the head of the seal and, on the other side, in a depression 26 of the upper edge 27 of the neck 6. As the lower part of the seal has a conical shape, these two end supports are not sufficient to provide a satisfactory guide for the spring, which is inclined to buckle.

However, satisfactory guiding is ensured by the shape shown in FIG. 6, which is provided with a lower cylindrical part lengthwise.

According to the invention, the spring 20 may alternatively be located in the chamber 8a instead of being arranged between the core 4 and the end 24" of the pipe 24' (FIG. 1) or pipe 24 (FIG. 2). Losses of magnetic flux are thus eliminated, hence the electromagnet works better. The different positioning of the spring has thus been made possible by the shape of the seal 19.

Finally, another aim of the present invention is the provision of an assembly of several valves, such as shown in FIGS. 3–5, and especially in view of their common electrical parts. As shown particularly in FIG. 5, a plate 28 closing the armatures 3, 3', common to all electromagnets, carries a printed circuit which provides the wiring needed to connect the terminals of the windings 2, which are each fitted into seats such as 29a, 29b . . . . to the plugs 30. Plug 30 are also assembled on a part 32 of the plate 28 arranged to appear in a seat 31 on the outside of case 1, in order to allow a simultaneous connection of all the couplings to the switches of the devices to be operated by the valve assembly.

It can be seen that in this drawing, the closure of case 1 is obtained by fastening the lid with screens. It will be understood that any other method can be used, notably ultrasonic welding of the screws fitted inside their corresponding seats.

The present invention provides both an individual valve and an assembly for any number of valves, irrespective of the source of fluid energy, nature of the fluid or, high or low residual vacuum.

We claim:

1. An electrically actuated valve comprising:
  (a) structure defining a case and valve body attached thereto defining a control chamber with a first supply port adapted for connection to a vacuum source and signal port adapted for connection to a vacuum actuated device to be controlled;
  (b) a bobbin received in said case and having an electrical winding thereon and adapted for electrical connection thereto;
  (c) said bobbin having a first portion extending from said case and sealed against said body for closing said control chamber and a second portion disposed in said case with said winding thereon, said first portion defining a valve seat thereon communicating with a fluid passage through said first and second portions;
  (d) a pole frame providing a magnetic flux path about said winding, said pole frame including a member extending axially within said bobbin second portion and defines an atmospheric inlet port communicating with said bobbin passage;
  (e) a core member movably disposed in said bobbin second portion and having attached thereto a stem extending through said valve seat;
  (f) a seal member attached to said stem, said seal member operative upon movement of said core, responsive to winding energization, to have first portions thereof contact said valve seat and block flow between said control chamber and said bobbin passage, said seal having second portions thereof contacting said supply port and blocking same when said winding is not energized and opening same when said winding is energized; and,
  (g) means biasing said stem in a direction for causing said seal member second portions to block said supply port.

2. The device defined in claim 1, wherein said biasing means comprises a spring having one end thereof registered against said bobbin first portion with the opposite end registered against said seal member.

3. The valve defined in claim 1, wherein said axial pole frame member has portions thereof extending externally of said case defining structure.

4. An electrically operated valve assemblage comprising:
  (a) a plurality of the valves described in claim 1;
  (b) means defining a common manifold connected for supplying the supply ports of each of said valves from a single supply inlet to the manifold; and,
  (c) the housing means for each of said valves comprises a common case having all of the coils of said valves disposed therein with the said control chamber remaining portions disposed exteriorly of said case.

5. The assemblage defined in claim 4, further comprising printed circuit means disposed within said common case, said printed circuit means connecting to the terminal means for each of said valve coils and having circuit means thereon for common electrical power connection to said coils.

6. The valve assemblage defined in claim 4, wherein said common electrical power connection comprises a plurality of connector pins disposed in closely spaced group arrangement disposed adjacent one end of said manifold.

7. The valve assemblage defined in claim 4, wherein said valves are arranged in a line.

* * * * *